(12) United States Patent
Browne et al.

(10) Patent No.: US 7,703,612 B2
(45) Date of Patent: Apr. 27, 2010

(54) VIBRATORY SEPARATOR

(75) Inventors: Neale Browne, Houston, TX (US);
Brian Carr, Burlington, KY (US)

(73) Assignee: M-I L.L.C., Houston, TX (US)

( * ) Notice: Subject to any disclaimer, the term of this patent is extended or adjusted under 35 U.S.C. 154(b) by 280 days.

(21) Appl. No.: 11/610,488

(22) Filed: Dec. 13, 2006

(65) Prior Publication Data

US 2007/0131592 A1 Jun. 14, 2007

Related U.S. Application Data

(60) Provisional application No. 60/750,090, filed on Dec. 13, 2005, provisional application No. 60/827,453, filed on Sep. 29, 2006.

(51) Int. Cl.
*B07B 1/28* (2006.01)

(52) U.S. Cl. .................................. 209/311; 209/314

(58) Field of Classification Search .............. 209/309, 209/311, 313, 315, 322, 326
See application file for complete search history.

(56) References Cited

U.S. PATENT DOCUMENTS

| | | | | |
|---|---|---|---|---|
| 4,446,022 A * | 5/1984 | Harry | ........................ | 210/388 |
| 5,919,358 A | 7/1999 | Williams | | |
| 6,024,228 A | 2/2000 | Williams | | |
| 6,530,482 B1 * | 3/2003 | Wiseman | .................... | 209/253 |
| 7,278,540 B2 * | 10/2007 | Stone et al. | ................. | 209/309 |
| 2003/0047493 A1 | 3/2003 | Schulte | | |

(Continued)

FOREIGN PATENT DOCUMENTS

DE 40 12 802 A1 2/1991

(Continued)

OTHER PUBLICATIONS

Extended European Search Report, dated Nov. 30, 2009, for European Patent Application No. 06839353.7.

*Primary Examiner*—Patrick H Mackey
*Assistant Examiner*—Terrell H Matthews (57) ABSTRACT

An apparatus for separating solids from a drilling fluid that includes a basket having two opposed spaced-apart side walls having first ends and second ends, the first ends spaced apart by an end wall connected to each of the side walls, the basket further including a bottom wall through which a fluid outlet passage is defined, a plurality of screening surfaces having a front edge and a back edge and positioned within the basket between the side walls with each screening surface spaced apart vertically from adjacent screening surfaces and the back edge spaced apart from the end wall of the basket, wherein the back edge of each screening surface is lower than the front edge of the corresponding screening surface, a plurality of weirs, each weir retained along the back edge of a corresponding screening surface and spaced apart from the end wall to define a fluid passage between each weir and the end wall, wherein each weir has a top edge extending to a weir height above the back edge of the corresponding screening surface and the top edge is lower than the front edge of the corresponding screening surface, at least one flow director catching unseparated drilling fluid in the fluid passage and directing the unseparated drilling fluid onto a lower screen, and wherein fluid in the fluid passage between the lowermost screen and the end wall is directed to a spillover fluid outlet is disclosed.

20 Claims, 5 Drawing Sheets

U.S. PATENT DOCUMENTS

2003/0201237 A1* 10/2003 Grichar et al. ............... 210/785
2006/0243643 A1* 11/2006 Scott et al. .................. 209/309

FOREIGN PATENT DOCUMENTS

| | | | |
|---|---|---|---|
| DE | 10 2004 054275 A1 | 5/2006 | |
| EP | 0 143 080 A2 | 5/1985 | |
| EP | 1 088 582 A2 | 4/2001 | |
| EP | 1 631 367 B1 | 8/2009 | |
| JP | 2007037831 A1 * | 2/2007 | |
| WO | 2004110589 A1 | 12/2004 | |

* cited by examiner

VIBRATORY SEPARATOR

This application claims the benefit of U.S. Provisional Application No. 60/750,090, filed Dec. 13, 2005 and U.S. Provisional Application No. 60/827,453, filed Sep. 29, 2006 the contents of which are incorporated herein by reference.

BACKGROUND OF INVENTION

Oilfield drilling fluid, often called "mud," serves multiple purposes in the industry. Among its any functions, the drilling mud acts as a lubricant to cool rotary drill bits and facilitate faster cutting rates. The mud is mixed at the surface and pumped downhole through a bore of the drillstring to the drill bit where it exits through various nozzles and ports, lubricating and cooling the drill bit. After exiting through the nozzles, the "spent" fluid returns to the surface through an annulus formed between the drillstring and the drilled wellbore.

Furthermore, drilling mud provides a column of hydrostatic pressure, or head, to prevent "blow out" of the well being drilled. This hydrostatic pressure offsets formation pressures thereby preventing fluids from blowing out if pressurized deposits in the formation are breached. Two factors contributing to the hydrostatic pressure of the drilling mud column are the height (or depth) of the column (i.e., the vertical distance from the surface to the bottom of the wellbore) and the density (or its inverse, specific gravity) of the fluid used. Various weighting and lubrication agents are mixed into the drilling mud to obtain the right mixture for the type and construction of the formation to be drilled. Because the mud evaluation and mixture process is time consuming and expensive, drillers and service companies prefer to reclaim the returned drilling mud and recycle it for continued use.

Another significant purpose of the drilling mud is to carry the cuttings away from the drill bit to the surface. As a drill bit pulverizes or scrapes the rock formation at the bottom of the borehole, small pieces of solid material are left behind. The drilling fluid exiting the nozzles at the bit stir up and carry the solid particles of rock and formation to the surface within the annulus between the drillstring and the borehole. Therefore the fluid exiting the borehole from the annulus is a slurry of formation cuttings in drilling mud, and the cutting particulates must be removed before the mud can be recycled.

One type of apparatus used to remove cuttings and other solid particulates from drilling mud is commonly referred to in the industry as a "shale shaker" or "vibratory separator." A shale shaker is a vibrating sieve-like table upon which returning used drilling mud is deposited and through which substantially cleaner drilling mud emerges. Typically, the shale shaker is an angled table with a generally perforated filter screen bottom. Returning drilling mud is deposited at a first end of the shale shaker. As the drilling mud travels across the perforated screen, the fluid falls through the perforations to a reservoir below thereby leaving the solid particulate material behind. The combination of the angle of inclination with the vibrating action of the shale shaker table enables the solid particles left behind to flow until they fall of the second end of the shaker table. The amount of vibration and the angle of inclination are typically adjustable to accommodate various drilling mud flow rates and particulate percentages in the drilling mud. After the fluid passes through the perforated bottom of the shale shaker, it can either return to service in the borehole immediately, be stored for measurement and evaluation, or it may pass through another, smaller size shale shaker or other equipment to further remove smaller cuttings.

As mud is circulated through the shaker separators and other cuttings removal apparatus, the flow rate of the feed mud may increase when the driller is flushing the wellbore or the geology of the wellbore requires a change in drilling fluid properties. The flow rate may increase to such an extent that the mesh of the screening surface can become congested with solids that are not removed fast enough to allow the fluid component of the feed mud to flow through the screen.

To prevent the loss of valuable drilling mud over the front edge of the screening surface and into the cuttings collection area during such flow rate increases, the front end of the separator is often raised so that the front edge of the screening surface is higher than the back edge of the screening surface. When the separator is actuated, the screening surfaces and basket within which they are secured vibrate at a desired frequency and with a predetermined motion, such as linear, elliptical, or circular. While the basket and screens vibrate at a predetermined frequency and motion, the housing to which the basket is resiliently mounted does not vibrate. This often results in the presence of a small gap between the back edge of the basket and the housing. Unfiltered drilling fluid drains directly into the filtered fluid collection area through the resulting gap. When the front end of the separator is raised, as during normal operation of the vibratory separator, the quantity of unfiltered drilling fluid that drains into the filtered fluid can increase when the mud depth increases. It would be an improvement to the quality of drilling fluid being filtered by the vibratory separator, to direct such unfiltered fluid into a secondary screen.

The condition of the screens may also contribute to the commingling of unfiltered drilling fluid with filtered drilling fluid. As drilling fluid solids are filtered from the drilling fluid, the wires making up the screening surface are subject to breakage. Such breakage is more prevalent near the back of the screening surface, where the unfiltered drilling mud is initially directed onto the screening surface. As the wires break, a hole or tear in the screen forms and becomes larger, which leads to more solids passing through the screening surface. Because separators are typically in continuous use, any repair operations and associated downtimes are minimized to the extent possible. Often, the screens of separators, through which the solids are separated from the drilling mud wear out over time and need replacement. Therefore, separator filter screens are typically constructed to be quickly and easily removed and replaced. Generally, through the loosening of only a few bolts, the filter screen can be lifted out of the shaker assembly and replaced within a matter of minutes. Additional screening surfaces that are vertically arranged would expose the drilling fluid to multiple screens, thereby reducing the effects of a tear or break in any single screen. Further, the replacement of a single screen could be deferred until additional screens break or there is down time in the drilling operation.

Many separator are equipped with screens having a lower mesh size than is preferable. This results in the removal of coarse solids but permits some solids that are larger than preferable to pass through the screen and remain in the filtered drilling fluid. Among the reasons for using screens having larger perforations include the desire to salvage drilling fluid when there are surges in the fluid flow to the shaker separator. By having larger perforations in the screen, more fluid passes and less fluid is discarded with the cuttings. Another reason for using such screens is to increase the capacity of the separator to filter the drilling fluid. Screens having smaller perforations cannot filter the same quantity of drilling fluid in a period of time as do screens having larger perforations. It would be an improvement to provide more desirable mesh sizes without the undesirable side effect of losing drilling fluid into the cuttings collection area.

Power loss or fluctuation in power to a shaker reduces the G-force of the shaker, causing the screening process to lose efficiency. The solids in the unfiltered mud are no longer propelled to the front of the screen and instead accumulate on the screening surface. As the used mud continues to be provided onto the screening surface, the lack of vibration results in the larger solids settling on the screening surface, causing it to become clogged such that much of the fluid does not pass through the screen mesh. If sufficient power is not promptly restored, the unfiltered drilling fluid will accumulate in the space defined by the inclined screen surface, the rear wall of the basket, the side walls of the separator to eventually overflow the front edge of the screening surface into a cuttings box or solids collection area. When the drilling fluid overflows into the cuttings collection area, additional treatment of the cuttings is usually required before the cuttings can be properly disposed. Although it is not desirable to have unfiltered drilling fluid continually released to the collection area for filtered drilling fluid, such a result is preferred when compared to losing the valuable drilling fluid in the cuttings collection area. More preferential would be to separately collect the unfiltered drilling fluid for re-circulation through the shaker.

SUMMARY

In one aspect, embodiments disclosed herein relate to an apparatus for separating solids from a drilling fluid that includes a basket having two opposed spaced-apart side walls having first ends and second ends, the first ends spaced apart by an end wall connected to each of the side walls, the basket further including a bottom wall through which a fluid outlet passage is defined, a plurality of screening surfaces having a front edge and a back edge and positioned within the basket between the side walls with each screening surface spaced apart vertically from adjacent screening surfaces and the back edge spaced apart from the end wall of the basket, wherein the back edge of each screening surface is lower than the front edge of the corresponding screening surface, a plurality of weirs, each weir retained along the back edge of a corresponding screening surface and spaced apart from the end wall to define a fluid passage between each weir and the end wall, wherein each weir has a top edge extending to a weir height above the back edge of the corresponding screening surface and the top edge is lower than the front edge of the corresponding screening surface, at least one flow director catching unseparated drilling fluid in the fluid passage and directing the unseparated drilling fluid onto a lower screen, and wherein fluid in the fluid passage between the lowermost screen and the end wall is directed to a spillover fluid outlet.

In another aspect, embodiments disclosed herein relate to an apparatus for separating solids from drilling fluid that includes a basket having two opposed spaced-apart side walls having first ends and second ends, the first ends spaced apart by an end wall connected to each of the side walls, a plurality of screening surfaces having a front edge, a back edge, and a pair of spaced-apart side edges, the side edges extending between the front edge and the back edge, wherein the screening surfaces are positioned within the basket between the side walls with each screening surface spaced apart vertically from adjacent screening surfaces and the back edge spaced apart from the end wall of the basket, wherein the back edge of each screening surface is lower than the front edge of the corresponding screening surface, wherein the side edges of the uppermost screening surface are spaced-apart from the side walls of the basket, a plurality of weirs, wherein each weir is retained along the back edge of a corresponding screening surface and is spaced apart from the end wall to define a fluid passage between each weir and the end wall, wherein each weir has a top edge extending to a weir height above the back edge of the corresponding screening surface and the top edge is lower than the front edge of the corresponding screening surface, wherein each weir height is adjustable, at least one flow director catching unseparated drilling fluid in the fluid passage and directing the unseparated drilling fluid onto a lower screen, and a pair of opposed side dams retained along at least a portion of the side edges of the uppermost screening surface and spaced apart from the side walls to further define the fluid passage.

In yet another aspect, embodiments disclosed herein relate to an apparatus for separating solids from a fluid that includes a basket having two opposed spaced-apart side walls having first ends and second ends, the first ends spaced apart by an end wall connected to each of the side walls, a plurality of screening surfaces positioned within the basket between the side walls with each screening surface spaced apart vertically from adjacent screening surfaces, wherein each screening surface includes a front edge, a back edge spaced-apart from and lower than the front edge, and a pair of spaced-apart side edges, the side edges extending between the front edge and the back edge and the back edge spaced-apart from the end wall, a weir retained along the back edge of each screening surface and spaced apart from the end wall to define a fluid passage between each weir and the end wall, wherein each weir has a top edge extending to a weir height above the back edge of a corresponding screening surface and the top edge is lower than the front edge of the corresponding screening surface, and at least one flow director catching unseparated fluid in the fluid passage and directing the unseparated fluid onto a lower screen.

Other aspects and advantages of the claimed subject matter will be apparent from the following description and the appended claims.

DETAILED DESCRIPTION

In one aspect, embodiments disclosed herein relate to a shale shaker having a screen arrangement precluding the loss of whole mud over the front edge of the screening surface. Specifically the embodiments disclosed herein relate to a shale shaker having an arrangement of screening surfaces, weirs, and a flow director to direct excess fluid to a subsequent screening surface or a collection area for recirculation through the shaker.

Figure 1:
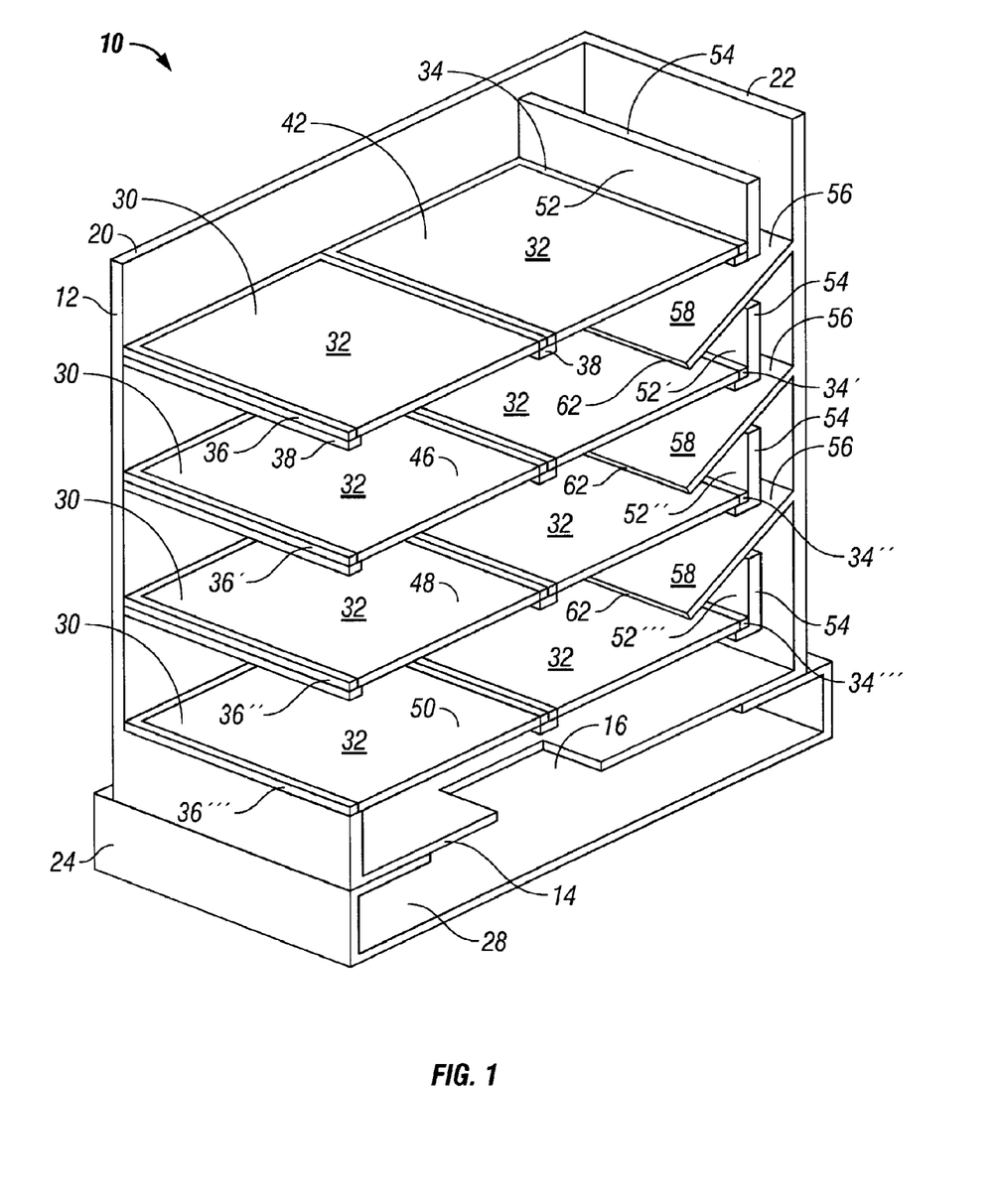
FIG. 1 is a partial isometric view of a vibratory separator in accordance with embodiments disclosed herein.
Figure 3:
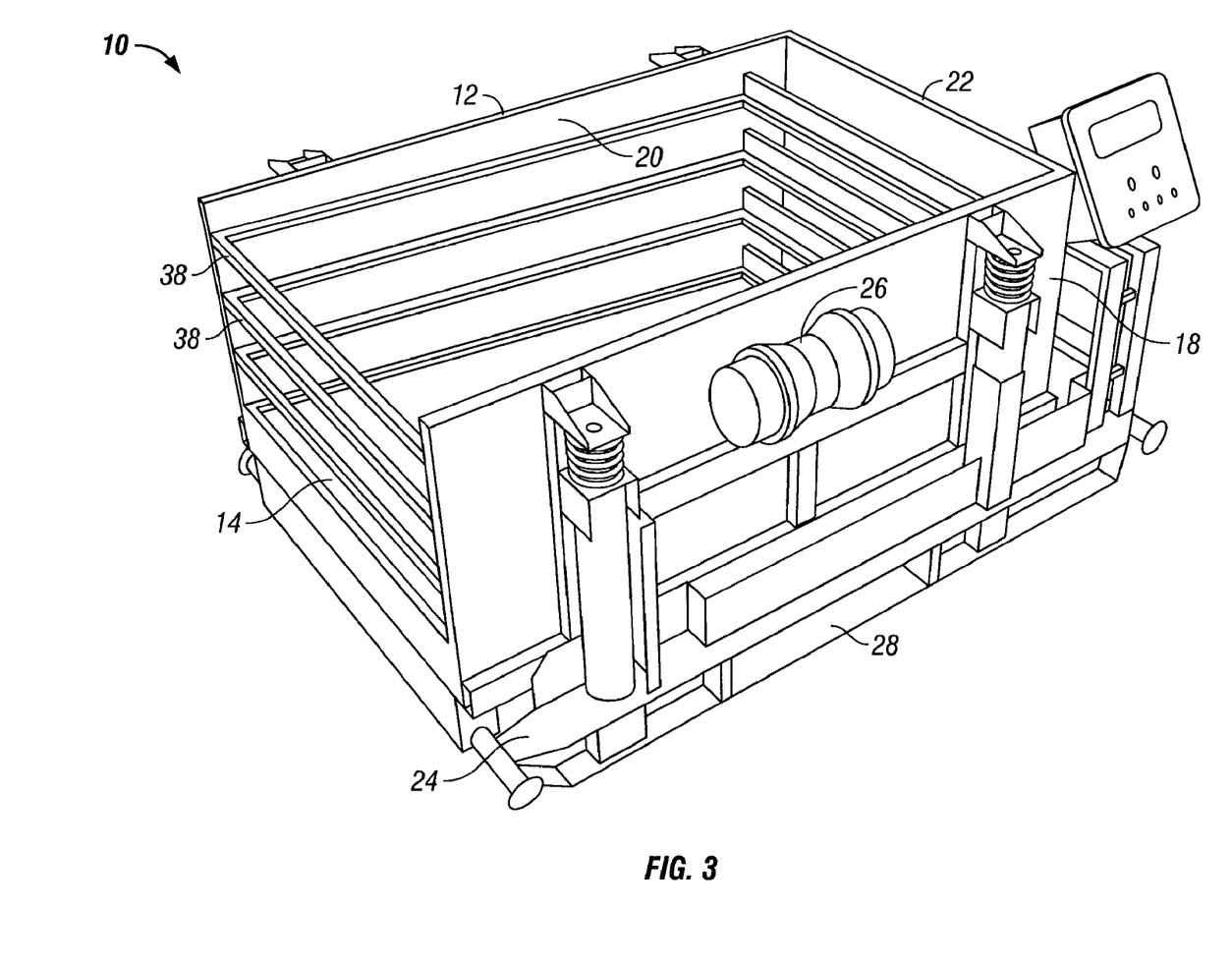
FIG. 3 is a partial isometric view of a vibratory separator in accordance with embodiments disclosed herein.

Referring to FIGS. 1 and 3, a shaker in accordance with an embodiment of the present invention is shown. The reference numeral 10, refers, in general, to a vibrating screen separator assembly that includes a basket 12 that includes a bottom wall 14 having an opening 16, a pair of side walls, 18 and 20 (side wall 18 shown in FIG. 3), and an end wall 22. Side walls 18 and 20 are spaced-apart and have first ends and second ends. The first ends of each side wall 18, 20 are connected to end wall 22, wherein the end wall is located at the feed end of the shaker 10. Bottom wall 14 may be connected to a bottom edge of side walls 18, 20 and end wall 22. Opening 16 in bottom wall 14 is used to direct filtered fluid out of separator 10 for further processing, containment, or re-use. In one embodiment, bottom wall 14 is a structure having a plurality of openings 16. Basket 12 is resiliently mounted to a housing 24. Housing 24 may include an opening 28 that is in fluid communication with opening 16 in bottom wall 14. One or more actuators 26 (shown in FIG. 3) for imparting motion to basket 12 are coupled thereto. While actuators 26 are depicted on the side of basket 12 in order to show better show the details of the present invention, it will be appreciated that actuators 26 may be retained on a structure between side walls 18 and 20 and across the top of the basket 12.

A plurality of screening surfaces 30 are positioned within the basket 12 between side walls 18 and 20. Screening surfaces 30 include a back edge 34 and a front edge 36, each having ends between which side edges are located to define the screening area. The back edge 34 of each screening surface is that edge facing end wall 22 of the basket. As can be seen more clearly in FIG. 2, a space is formed between back edge 34 of screening surface 30 and end wall 22. It is contemplated that each screening surface 30 may include a plurality of individual screens 32. Alternatively, a single screen may represent the entire screening surface 30 for a particular level. Each screen 32 is located atop screen supports 38. Though depicted in the Figures as simply providing a surface upon which the perimeter of each screen 32 will rest, additional cross members (not shown) may be included to provide additional support to each screen 32. A means for securing each screen 32 to the screen supports 38 is provided. It is contemplated that securing means usual to the art will be utilized.

For purposes of explanation herein, four screening surfaces are depicted. It will be appreciated that any number of screening surfaces that may be provided. For general explanations regarding the screening surfaces, the number 30 is used. For explanations regarding features of a particular level, the uppermost screen is designated as 42, the lowermost screen is designated as 50. Intermediate screens are designated herein as 46 and 48, but it is understood that the intermediate screens may be eliminated without departing from the scope of this invention.

Figure 2:
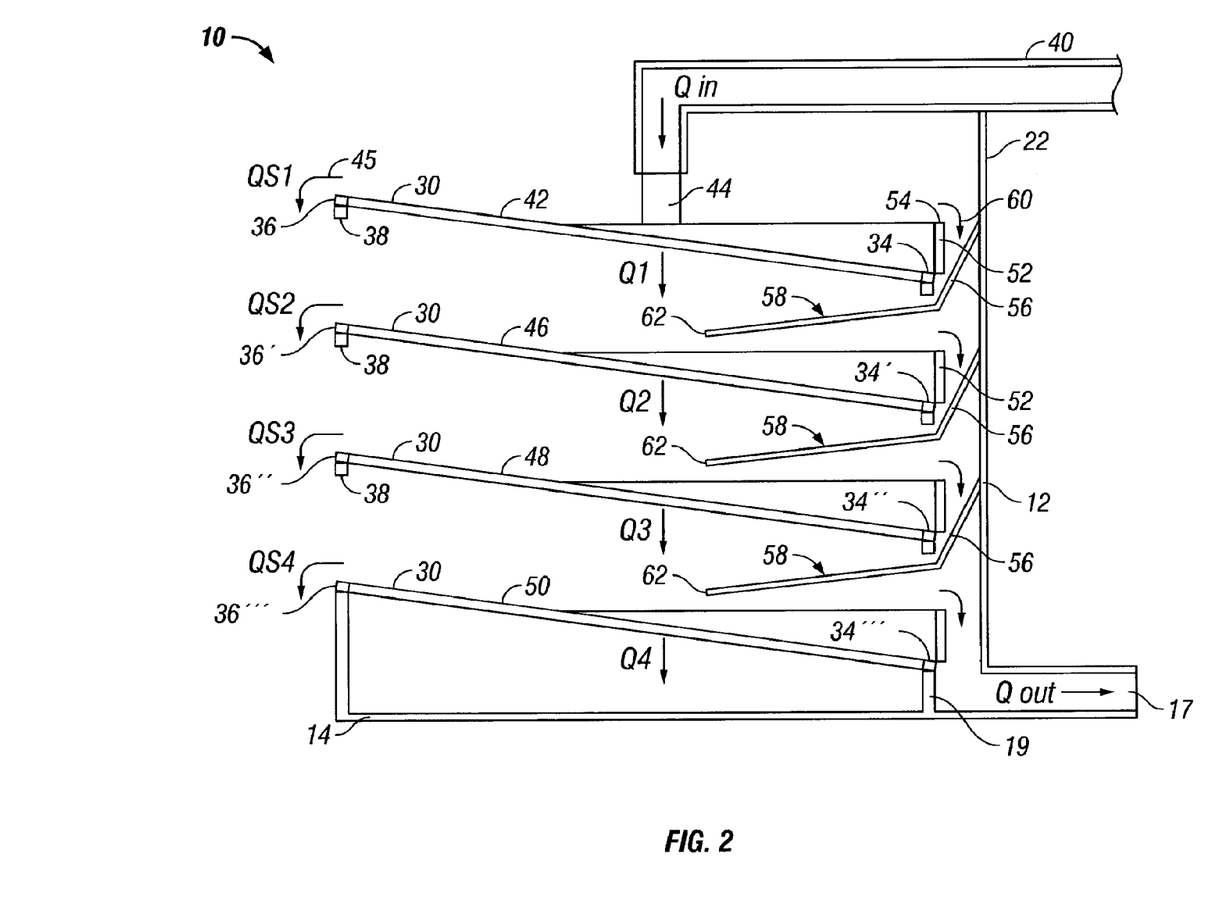
FIG. 2 is a schematic side view of a vibratory separator in accordance with embodiments disclosed herein.

Referring to FIGS. 1 and 2, each successive screening surface 30 may have a finer screen mesh to remove finer particles as the fluid progresses through the series of screening surfaces 30. Top screening surface 42 may have large perforations to remove only the most coarse solids in the drilling fluid 44. Second screening surface 46 may have a smaller perforations to separate smaller particles from drilling fluid that has been filtered by top screening surface 42. Third and fourth screening surfaces 48 and 50 may have mesh sizes to reduce even finer particles from the drilling fluid.

One advantage of having successively smaller screen perforations is that lower screen 50 or lower screens 48 and 50 may have a mesh size corresponding to the maximum desired particle size in the fluid discharged by the separator 10. Because larger oversized particles are removed on the top screen 42, these larger particles will not congest the lower screen 50. In addition, the multiple layers of screening surfaces 42, 46, 48, and 50 can handle a larger volume of fluid at any given instant than can a separator having a single screening surface. This, in turn, provides a fluid flow rate, $Q_{out}$, from separator 10 that is comparable to that of a single screening surface with the drilling fluid also exhibiting a finer cut.

Each screening surface 30 may be retained within the basket 12 such that it is parallel to the other screening surfaces 30. Alternatively, the screening surfaces 30 may be positioned at different angles relative to each other to optimize separation of cuttings and solids from the drilling fluid. In at least one embodiment, the screening surfaces 30 are not parallel with each other to optimize separation of cuttings and solids from drilling fluid. For example, the uppermost screening surface 42 may be at an angle that is in the range of −15° to 25° with respect to ground while the second screening surface 46 is in the range of 0.5° to 10° with respect to the uppermost screening surface 42. The lower screening surfaces may be in the range of 0.5° to 10° with respect to the adjacent upper screening surface.

Along the back edge 34 of each screening surface 30, a weir 52 is retained. Each weir 52 extends upward to a top edge 54 that is a weir height above the screening surface 30. The inclination of the screening surface 30 results in the top edge 54 of weir 52 being lower than front edge 36 of the corresponding screening surface 30 relative to the ground. As a result, fluid released onto the top screening surface 42 is bounded by the screen surface 30, side walls 18 and 20, and weir 52. Because the weir height and the inclination of screening surface 30 prevents fluid flow over front edge 36, excess fluid will flow over weir 52. Weir 52 is spaced apart from end wall 22 to define a fluid passage. When a flow of fluid released onto screening surface 30 is introduced at a rate faster than the fluid can traverse the screen perforations the fluid will overflow weir 52 into the fluid passage and will not overflow front edge 36. Advantageously, drilling fluid is not lost to the cuttings collection area. In one embodiment, weir 52 is affixed between side walls 18 and 20. In one embodiment, the height of weir 52 is adjustable with respect to the screening surface 30 to optimize pond depth at various angles of the screening surface 20. The height of weir 52 may be adjustable at each screening level to optimize pond depth at the particular angle of the corresponding screening surface 42, 46, 48, 50. In one embodiment, weir 52 is formed by the screen frame of the rearward-most screen, although this results in the inability to use a standard screen 32 in the rearward-most position.

Referring to FIG. 2, a flow box 40 is located near end wall 22 and directs the feed fluid 44 to be screened onto a top screening surface 42 sufficiently forward from back edge 34 so as to prevent fluid from flowing directly through the fluid passage between end wall 22 and weir 52. Although depicted as dropping fluid 44 onto the screening surface, it will be appreciated that the flow box 40 may be configured to direct fluid 44 in a direction across screening surface 30. The feed fluid 44 is directed onto the top screening surface 42 with a feed flow rate, $Q_{in}$. Due to the inclination of screening surface 30, the feed fluid gravitates towards back edge 34 of screening surface 30 until stopped by weir 52. When operating, the actuators 26 vibrate all screening surfaces 30 in such a way that solids too large to pass through the mesh are propelled toward front edge 36 and are discharged from separator 10. These oversized solids, represented by arrow 45, are discharged off of front edge 36 of top screening surface 30 at a solids discharge rate, $Q_s$. Fluid and small particles pass through the screen mesh of the top screening surface 42 at a flow rate, $Q_1$. The fluid and undersize particles fall through the mesh of the subsequent screening surfaces 46, 48, 50 at respective flow rates, $Q_n$, $Q_{n+1}$, etc. Although only four screening surfaces 30 are depicted in the Figures, it will be appreciated by those of skill in the art that any number of screening surfaces may be utilized.

The fluid and particles smaller than the mesh of screening surface 30 can proceed through the mesh surface of the screen. However, in some instances, the feed flow rate, $Q_{in}$, is faster than the combined rate at which solids are discharged, $Q_s$, and the rate at which fluid on the top screening surface 42 passes through the screen mesh, $Q_1$. In such instances feed fluid 44 will flow over top edge 54 of weir 52 and will not flow over front edge 36 of top screening surface 42. When $Q_{in}$ is greater than $Q_s+Q_1$, the feed fluid overflows the weir 52 at a rate, $Q_w$. This overflow rate may be expressed as:

$$Q_w=Q_{in}-(Q_s+Q_1).$$

Referring to FIGS. 1 and 2, a flow director 56 is positioned in the fluid passage to catch any overflow 60 from the upper adjacent screen and direct it onto the lower adjacent screen. In one embodiment, flow director 56 includes a flow surface 58 configured to guide overflow 60 to a predetermined area on the lower screening surface. In this embodiment, each flow surface 58 is mounted to basket 12 in such a way that any overflow 60 from the upper adjacent screen can be directed only to the lower adjacent screen. Flow surface 58 may be mounted to end wall 22 and extend between each side wall 18 and 20 to receive overflow 60 from the fluid passage between weir 52 and end wall 22. A front edge 62 of flow surface 58 may be configured to disperse overflow 60 onto the lower screening surface in such a way that impact caused by the flow onto screening surface 30 is minimized.

In one embodiment, the second screening surface 46 is positioned with front edge 36' higher than back edge 34', as was described for top screening surface 42. A second weir 52' is retained along back edge 34' of second screening surface 46. Additional screening surfaces 48, 50 may be provided, each having a front edge 36", 36'" higher than the respective back edge 34", 34'". Weirs 52" and 52'" are retained against back edges 34" and 34'" of each screening surface 48 and 50, respectively. As previously described, each weir 52" and 52'" has corresponding top edges 54" and 54'" that are lower than front edge 36" and 36'", respectively. An additional flow surface 58' is located between screening surfaces 46 and 48 and another flow surface 58" is located between screening surfaces 48 and 50 to direct overflow from the upper adjacent screening surface 46 or 48, respectively, to a predetermined area of the lower adjacent screening surface 48 or 50, respectively.

Figure 4:
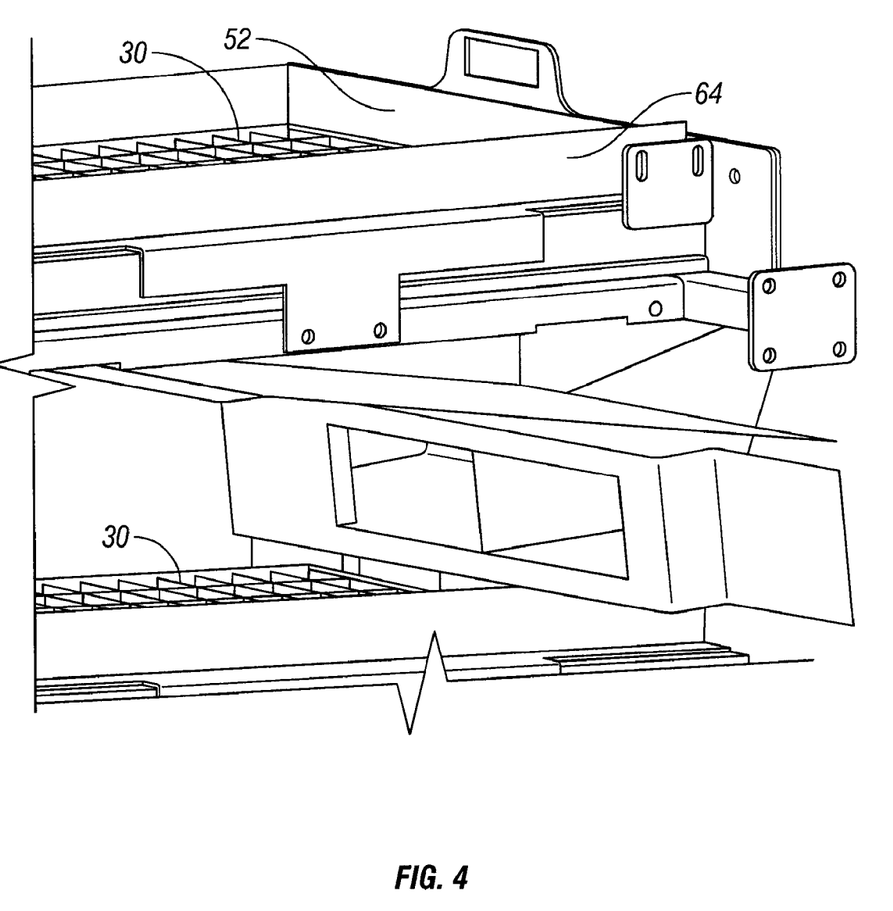
FIG. 4 is a partial isometric view of the screening surface and weir in accordance with embodiments disclosed herein.

Referring to FIG. 4, in one embodiment, side dams 64 are located along at least a portion of each side of screening surface 30. In this embodiment, side dams 64 extend upward from the screening surface 30 and forward from weir 52 to prevent fluid and solids from bypassing the screening surface 30 over the side edges. Side dams 64 are spaced apart from side walls 18 and 20 to further define the fluid passage. Side dams 64 may be included on one or more of the screening surfaces 42, 46, 48, and 50. Side dams 64 may be of adjustable height to optimize pond depth at the particular angle of the corresponding screening surface 42, 46, 48, 50. In one embodiment, the uppermost screening surface 42 includes side dams 64 while the lower screening surfaces 46, 48, and 50 extend between side walls 18, 20. In this embodiment, excess fluid flows over weir 52 and side dams 64 into the fluid passage and onto the next lower screen 46.

In one embodiment, all of the screening surfaces 30 include side dams 64. In this embodiment, the fluid passage extends between side dams 64 and side walls 18, 20 as well as between weir 52 and end wall 22. Flow surfaces 56 are provided along the extended fluid passage to direct flow from the fluid passage to the lower adjacent screening surface 30.

Referring again to FIGS. 1 and 2, below lowermost screening surface 50, filtered fluid is directed out of the shaker 10. In one embodiment, best depicted in FIG. 2, overflow of fluid from the lowermost screening surface 50 may be directed to outlet 17. Outlet 17 may direct unfiltered fluid to a holding tank (not shown) or through a line (not shown) for recirculation through shaker 10. The paths of filtered fluid and unfiltered fluid may be segregated by a wall 19 to ensure the unfiltered fluid does not contaminate the filtered fluid that is directed out of shaker 10 through opening 16. In the event of an overflow condition reaching the level of the lowermost screen 50, the fluid directed through outlet 17 has a flow rate $Q_U$ and the fluid directed through opening 16 has a flow rate $Q_F$. The combined flow rate $Q_{out}$ through both the outlet 17 and the opening 16 is preferably less than the flow rate into the separator 10, $Q_{in}$, due to the separation and discharge of solids at flow rate $Q_s$. However, opening 16 and outlet 17, together, should be equipped to handle an equivalent flow rate to $Q_{in}$ in the event that power is disrupted and fluid flow continues to be directed to separator 10. In such a case, however, the present invention prevents the loss of drilling fluid over front edge 36, into the solids discharge area. As one of skill in the art will appreciate, in the event of drilling fluid overflowing weir 52 corresponding to top screening surface 42, the drilling fluid may be filtered by one or more of the lower screening surfaces 46, 48, 50. Further, in the worst case event of a total power loss to vibratory separator 10, drilling fluid will sequentially fill screening surfaces 42, 46, 48, 50, overflow corresponding weirs 52, 52', 52", until overflowing weir 52'" corresponding to lowermost screening surface 50 into outlet 17. As previously discussed, this unfiltered mud may be directed out of separator 10 and retreated or treated by additional equipment to remove solids.

In one embodiment, wall 19 and outlet 17 are not present so that unfiltered fluid and filtered fluid are commingled and exit together through opening 16. In the event of an overflow condition reaching the level of lowermost screen 50 in this embodiment, the fluid overflowing weir 52'" is also directed out of the separator 10 through opening 16. The flow rate through opening 16, $Q_{out}$, preferably is less than the flow rate into separator 10, $Q_{in}$, due to the separation and discharge of solids at flow rate $Q_s$. However, opening 16 should be equipped to handle an equivalent flow rate to $Q_{in}$ in the event that power is disrupted and fluid flow continues to be directed to separator 10. In such a case, however, the present invention prevents the loss of drilling fluid over front edge 36, into the solids discharge area. As one of skill in the art will appreciate, in the event of drilling fluid overflowing weir 52 corresponding to top screening surface 42, the drilling fluid may be filtered by one or more of the lower screening surfaces 46, 48, 50. Further, in the worst case event of a total power loss to vibratory separator 10, drilling fluid will sequentially fill screening surfaces 42, 46, 48, 50, overflow corresponding weirs 52, 52', 52", until overflowing weir 52'" corresponding to lowermost screening surface 50 into opening 16. While unfiltered mud may be directed out of separator 10, such mud may be retreated or treated by additional downstream equipment to further remove solids.

Figure 5:
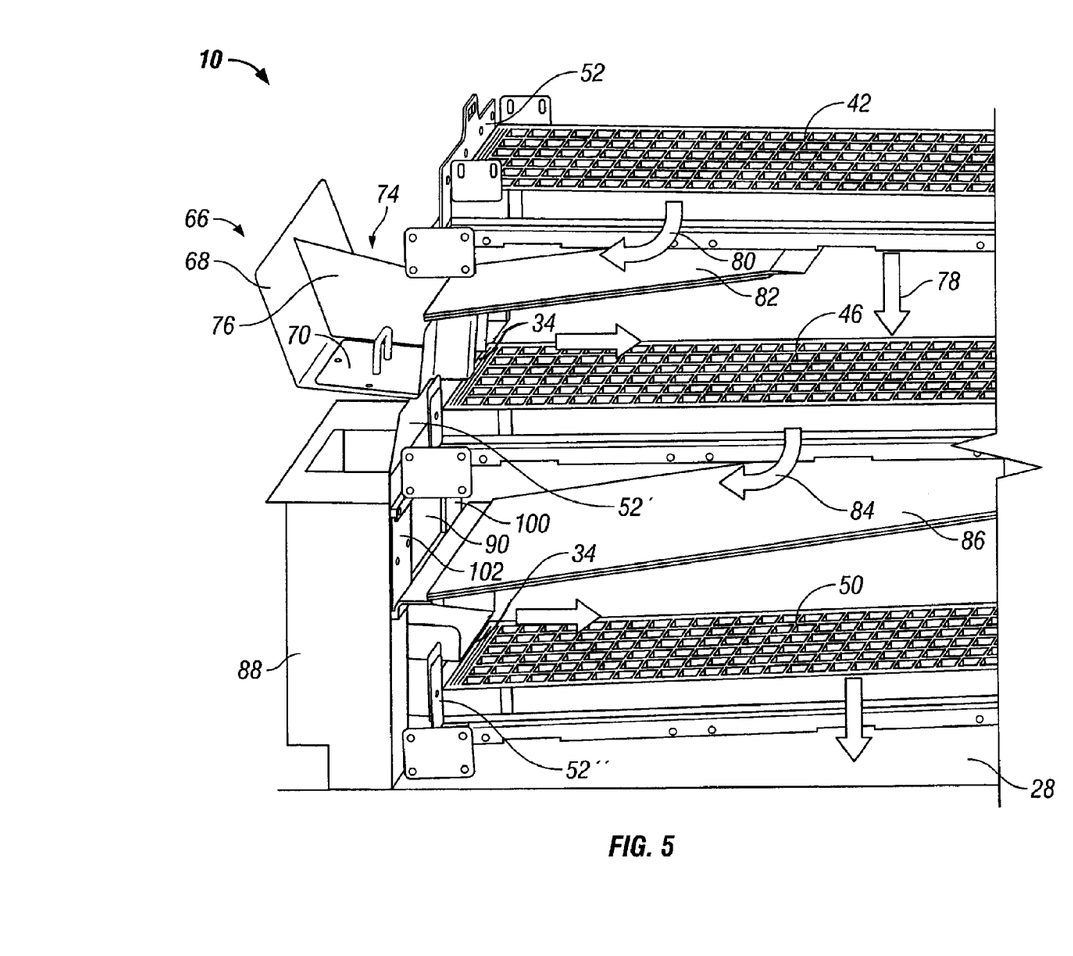
FIG. 5 is a partial view of the vibratory separator in accordance with embodiments disclosed herein.

Referring to FIG. 5, in one embodiment, flow director 56 is a conduit system 66, located at the feed end of separator 10. The conduit system 66 directs overflow fluid onto the screening surfaces 30 in series. As depicted in FIG. 5, conduit system 66 has an upper opening 74 positioned to receive fluid that overflows weir 52 of the uppermost screening surface 42. From the upper opening 74, the fluid is directed through a conduit to a first outlet positioned to direct the fluid onto the next screening surface 46. In one embodiment, the first outlet directs fluid onto the next screening surface 46 such that the fluid is directed across the screening surface 46 rather than dropped onto the screening surface 46. The screening surface 46 is wider than the width of the first outlet. The first outlet may be positioned along a central portion of the back edge 34 of the screening surface 46 or closer to one side or the other of the screening surface 46. The portion of the back edge 34 of the screening surface 46 to which the first outlet is not feeding has a weir arrangement 52' retained against it. Fluid directed to the second screening surface 46 at a flow rate exceeding the capacity of the screening surface 46 will overflow weir arrangement 52'. Some fluid may also back up in the conduit, but the first outlet has a height higher than the weir height so that the flow of fluid will continue to pour over weir arrangement 52' when a flow rate in excess of the screening surface 46 capacity occurs.

Fluid that overflows weir arrangement 52' is directed through a second inlet to a second outlet in the conduit system 66. The second outlet directs fluid onto the next screening surface 50. Like the first outlet, the second outlet directs the fluid across the screening surface 50. Also as with the first outlet, the second outlet has a width that is less than the width of the screening surface 50 to which the second outlet feeds. A weir 52'' is retained against the remaining portion of the back edge 34 of the screening surface 50. Thus, when fluid is directed across screening surface 50 at a flow rate in excess of the capacity of the screening surface 50 to filter, excess fluid will overflow the weir 52''. The excess fluid that overflows the weir 52'' may be directed to a lower screening system via the conduit system. When the lowermost screen is reached by the fluid and the flow rate is greater than the capacity of the lowermost screen to process, the fluid will over flow the associated weir retained along the back edge of the lowermost screen. The fluid will then be directed to a containment area for recirculation through the shaker or further treatment.

In one embodiment, flow back pans 82, 86 direct filtered fluid 80, 84, respectively, back to the conduit system 66. In this embodiment, unfiltered fluid overflowing weir 52 and filtered fluid 80 through uppermost screening surface 42 that is caught by flow back pan 82 are both directed to conduit system 66 and directed onto a lower screen 46. Flow back pans 82, 86 may be included beneath any and/or all screening surfaces 30.

While the claimed subject matter has been described with respect to a limited number of embodiments, those skilled in the art, having benefit of this disclosure, will appreciate that other embodiments can be devised which do not depart from the scope of the claimed subject matter as disclosed herein. For example, basket 12 may be lifted on one end to adjust the angle of screening surfaces 42, 46, 48, 50, so long as corresponding front edges 36, 36', 36'', 36''' are higher than top edge 54, 54', 54'', 54''' of corresponding weirs 52, 52', 52'', 52'''. Alternatively, or in addition, individual screening surfaces 42, 46, 48, 50 may be angularly adjustable so long as front edges 36-36''' are higher than top edge 54-54''' of corresponding weirs 52-52'''. Thus, screening surfaces 42, 46, 48, 50 may be adjusted together or individually so long as drilling fluid overflows weir 52-52''' rather than front edge 36-36'''. Any number of screening surfaces may be present in this stacked screen configuration. Accordingly, the scope of the claimed subject matter should be limited only by the attached claims.

What is claimed is:

1. An apparatus for separating solids from a drilling fluid comprising:

a basket having two opposed spaced-apart side walls having first ends and second ends, the first ends spaced apart by an end wall connected to each of the side walls, the basket further including a bottom wall through which a fluid outlet passage is defined;

a plurality of screening surfaces having a front edge and a back edge and positioned within the basket between the side walls with each screening surface spaced apart vertically from adjacent screening surfaces and the back edge spaced apart from the end wall of the basket;

wherein the back edge of each screening surface is lower than the front edge of the corresponding screening surface;

a plurality of weirs, each weir retained along the back edge of a corresponding screening surface and spaced apart from the end wall to define a fluid passage between each weir and the end wall;

wherein each weir has a top edge extending to a weir height above the back edge of the corresponding screening surface and the top edge is lower than the front edge of the corresponding screening surface;

at least one flow director catching unseparated drilling fluid overflowing the weir of an upper adjacent screening surface into the fluid passage and directing the unseparated drilling fluid onto a lower screen; and wherein fluid in the fluid passage between the lowermost screen and the end wall is directed to a spillover fluid outlet.

2. The apparatus of claim 1, wherein each the of plurality of screening surfaces includes a pair of spaced-apart side edges extending between the front edge and the back edge;

wherein the side edges are spaced apart from the side walls of the basket; and wherein the apparatus further comprises:

a pair of opposed side dams retained along at least a portion of the side edges of each screening surface and spaced apart from the side walls to further define the fluid passage between each weir and the side wall; and wherein the at least one flow director further catches flow of unseparated drilling fluid in the fluid passage and directs the flow onto the lower adjacent screening surface.

3. The apparatus of claim 1, further comprising:

a flow back pan beneath an upper screening surface that directs separated fluid to the flow director.

4. The apparatus of claim 1 wherein the uppermost weir is adjustable in height relative to the uppermost screening surface.

5. The apparatus of claim 1 wherein each weir height is adjustable.

6. The apparatus of claim 1 wherein the flow director further comprises: a conduit directing fluid onto the immediately lower adjacent screening surface.

7. The apparatus of claim 1 wherein the flow director further comprises:

a tray extending from the end wall to catch fluid flow from the fluid passage and direct the flow onto the lower adjacent screening surface.

8. The apparatus of claim 7, wherein each the of plurality of screening surfaces includes a pair of spaced-apart side edges extending between the front edge and the back edge;

wherein the side edges are spaced apart from the side walls of the basket; and wherein the apparatus further comprises:

a pair of opposed side dams retained along at least a portion of the side edges of each screening surface and spaced apart from the side walls to further define the fluid passage between each weir and the side wall; and
wherein the tray catches flow of unseparated drilling fluid in the fluid passage and directs the flow onto the lower adjacent screening surface.

9. An apparatus for separating solids from drilling fluid comprising:
a basket having two opposed spaced-apart side walls having first ends and second ends, the first ends spaced apart by an end wall connected to each of the side walls;
a plurality of screening surfaces having a front edge, a back edge, and a pair of spaced-apart side edges, the side edges extending between the front edge and the back edge;
wherein the screening surfaces are positioned within the basket between the side walls with each screening surface spaced apart vertically from adjacent screening surfaces and the back edge spaced apart from the end wall of the basket;
wherein the back edge of each screening surface is lower than the front edge of the corresponding screening surface;
wherein the side edges of the uppermost screening surface are spaced-apart from the side walls of the basket;
a plurality of weirs, wherein each weir is retained along the back edge of a corresponding screening surface and is spaced apart from the end wall to define a fluid passage between each weir and the end wall;
wherein each weir has a top edge extending to a weir height above the back edge of the corresponding screening surface and the top edge is lower than the front edge of the corresponding screening surface;
wherein each weir height is adjustable;
at least one flow director catching unseparated drilling fluid overflowing the weir of an upper adjacent screening surface into the fluid passage and directing the unseparated drilling fluid onto a lower screen; and
a pair of opposed side dams retained along at least a portion of the side edges of the uppermost screening surface and spaced apart from the side walls to further define the fluid passage.

10. The apparatus of claim 9, further comprising:
a flow back pan beneath an upper screening surface that directs separated fluid to the flow director.

11. The apparatus of claim 9 wherein the flow director further comprises:
a conduit directing fluid onto the immediately lower adjacent screening surface.

12. The apparatus of claim 9 wherein the flow director further comprises:
a tray extending from the end wall into the fluid passage and over the immediately lower adjacent screening surface.

13. The apparatus of claim 9 wherein the uppermost screening surface comprises a scalping screen.

14. An apparatus for separating solids from a fluid comprising:
a basket having two opposed spaced-apart side walls having first ends and second ends, the first ends spaced apart by an end wall connected to each of the side walls;
a plurality of screening surfaces positioned within the basket between the side walls with each screening surface spaced apart vertically from adjacent screening surfaces, wherein each screening surface includes a front edge, a back edge spaced-apart from and lower than the front edge, and a pair of spaced-apart side edges, the side edges extending between the front edge and the back edge and the back edge spaced-apart from the end wall;
a weir retained along the back edge of each screening surface and spaced apart from the end wall to define a fluid passage between each weir and the end wall;
wherein each weir has a top edge extending to a weir height above the back edge of a corresponding screening surface and the top edge is lower than the front edge of the corresponding screening surface; and
at least one flow director catching unseparated fluid overflowing the weir of an upper adjacent screening surface into the fluid passage and directing the unseparated fluid onto a lower screen.

15. The apparatus of claim 14 wherein each weir height is adjustable.

16. The apparatus of claim 15, further comprising:
a flow back pan beneath an upper screening surface that directs separated fluid to the flow director.

17. The apparatus of claim 16 wherein the flow director further comprises:
a conduit directing fluid onto the immediately lower adjacent screening surface.

18. The apparatus of claim 16 wherein the flow director further comprises:
a tray extending from the end wall into the fluid passage and over the immediately lower adjacent screening surface.

19. The apparatus of claim 14 wherein the uppermost screen further comprises a scalping screen.

20. The apparatus of claim 19 wherein each screening surface lower in the basket includes a screen having a mesh size for separating finer solids than the screening surface higher in the basket.

* * * * *